United States Patent
Pan et al.

(10) Patent No.: US 11,010,255 B2
(45) Date of Patent: May 18, 2021

(54) DATA STORAGE STRATEGY DETERMINATION

(71) Applicant: International Business Machines Corporation, Armonk, NY (US)

(72) Inventors: Tian Ming Pan, BeiJing (CN); Bo Chen Zhu, Xi'an (CN); Peng Fei Tian, Beijing (CN); Yan Bin Hu, Beijing (CN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 16/574,179

(22) Filed: Sep. 18, 2019

(65) Prior Publication Data
US 2021/0081279 A1 Mar. 18, 2021

(51) Int. Cl.
*G06F 11/14* (2006.01)
*G06F 11/07* (2006.01)

(52) U.S. Cl.
CPC ...... *G06F 11/1451* (2013.01); *G06F 11/0793* (2013.01); *G06F 11/1456* (2013.01); *G06F 11/1464* (2013.01); *G06F 11/1469* (2013.01)

(58) Field of Classification Search
CPC ............. G06F 11/1451; G06F 11/0793; G06F 11/1464; G06F 11/1456; G06F 11/1469
See application file for complete search history.

(56) References Cited

U.S. PATENT DOCUMENTS 7,761,456 B1 7/2010 Cram et al.
10,083,095 B1 9/2018 Chopra et al.
2007/0179995 A1* 8/2007 Prahlad ............... G06F 11/1464
2012/0131583 A1 5/2012 Cherkasova et al.
2019/0188520 A1* 6/2019 Neumeier ............... G06K 9/52
2020/0183794 A1* 6/2020 Dwarampudi ...... G06F 11/1453

FOREIGN PATENT DOCUMENTS

CN 103778034 A 12/2017

OTHER PUBLICATIONS

Foster, "Putting backup and recovery to work with artificial intelligence, machine learning." https://www.commvault.com/blogs/2018/april/putting-backup-and-recovery-to-work-with-artificial-intelligence-machine-learning, Apr. 28, 2018. 4 pages.

* cited by examiner

*Primary Examiner* — David Yi
*Assistant Examiner* — Zubair Ahmed
(74) *Attorney, Agent, or Firm* — Cantor Colburn LLP; Teddi Maranzano (57) ABSTRACT

Techniques for data storage strategy determination are described herein. An aspect includes determining a plurality of file classifications for files that are stored in a data storage system based on performance history data of a disaster recovery (DR) system of the data storage system. Another aspect includes determining classification records and performance records for the DR system based on the plurality of file classifications. Another aspect includes determining an information loss based on the performance records. Another aspect includes determining a total cost savings based on the classification records. Another aspect includes determining a recommended recovery time objective (RTO)/recovery point objective (RPO) strategy based on the information loss and the total cost savings. Another aspect includes implementing the recommended RTO/RPO strategy in the DR system.

14 Claims, 8 Drawing Sheets

| FILE | SOLVE TREE | COMP | TXN | FILE I/O | DATA VERB | CONF VERB | ENDTXN VERB | THREAD WAIT | OTHER | I/O R/W | CPU | CLASS |
|---|---|---|---|---|---|---|---|---|---|---|---|---|
| PEG307.PPT | 21 | 0 | 2 | 56 | 163 | 0 | 136 | 618 | 77 | 1203 | 1 | A |
| ZHONGX.DOC | 18 | 0 | 2 | 52 | 147 | 0 | 142 | 685 | 77 | 1037 | 1 | B |
| LION.DOC | 16 | 0 | 3 | 14 | 256 | 0 | 116 | 594 | 69 | 4195 | 2 | B |
| DB.BIN | 24 | 173 | 288 | 3767 | 43137 | 1 | 234 | 222 | 202 | 2211301 | 12 | C |
| ENG.PDF | 20 | 2 | 2 | 17 | 282 | 0 | 100 | 562 | 86 | 10034 | 2 | B |
| REPT.PDF | 23 | 2 | 2 | 845 | 386 | 0 | 185 | 179 | 74 | 14370 | 2 | B |
| WBPLYR.EXE | 19 | 1 | 2 | 40 | 854 | 1 | 90 | 186 | 103 | 31840 | 3 | A |
| TOOLBX.EXE | 21 | 15 | 52 | 4426 | 4045 | 0 | 110 | 174 | 68 | 208455 | 7 | C |
| VID.TAR.BZ2 | 17 | 41 | 78 | 632 | 11203 | 0 | 141 | 178 | 71 | 553763 | 9 | A |

| LM \ LA | 3% | 5% | 8% | 10% | 15% |
|---|---|---|---|---|---|
| 3% | 1H, 7% | 3H, 10% | 3H, 10% | 3H, 10% | 3H, 10% |
| 5% | 1.5H, 9% | 4.5H, 13% | 4.5H, 13% | 4.5H, 13% | 4.5H, 13% |
| 8% | 1.5H, 9% | 5H, 14% | 5H, 14% | 5H, 14% | 5H, 14% |
| 10% | 3H, 9% | 1D, 16% | 1.5D, 18% | 2D, 20% | 2D, 20% |
| 15% | 4H, 9% | 1D, 16% | 1.5D, 18% | 2D, 20% | 3D, 20% |

FIG. 8

DATA STORAGE STRATEGY DETERMINATION

BACKGROUND

The present invention generally relates to computer systems, and more specifically, to data storage strategy determination for a computer system.

An enterprise data storage system may be composed of a number of interconnected computer storage devices, such as servers, that operate together as a storage pool. Data backups may be performed on a defined schedule in an enterprise data storage system so as to avoid data loss should any device in the enterprise data storage system experience errors. When an error occurs, the data may be recovered based on a most recent backup. A strategy for backup scheduling in the enterprise data storage system may be determined based on, for example, user input. However, a user may not have sufficient knowledge to define an appropriate backup strategy for the user's data that is stored in the enterprise data storage system.

SUMMARY

Embodiments of the present invention are directed to data storage strategy determination. A non-limiting example computer-implemented method includes determining a plurality of file classifications for files that are stored in a data storage system based on performance history data of a disaster recovery (DR) system of the data storage system. The method also includes determining classification records and performance records for the DR system based on the plurality of file classifications. The method also includes determining an information loss based on the performance records. The method also includes determining a total cost savings based on the classification records. The method also includes determining a recommended recovery time objective (RTO)/recovery point objective (RPO) strategy based on the information loss and the total cost savings. The method also includes implementing the recommended RTO/RPO strategy in the DR system.

Other embodiments of the present invention implement features of the above-described method in computer systems and computer program products.

Additional technical features and benefits are realized through the techniques of the present invention. Embodiments and aspects of the invention are described in detail herein and are considered a part of the claimed subject matter. For a better understanding, refer to the detailed description and to the drawings.

BRIEF DESCRIPTION OF THE DRAWINGS

The specifics of the exclusive rights described herein are particularly pointed out and distinctly claimed in the claims at the conclusion of the specification. The foregoing and other features and advantages of the embodiments of the invention are apparent from the following detailed description taken in conjunction with the accompanying drawings in which:

DETAILED DESCRIPTION

One or more embodiments of the present invention provide data storage strategy determination. A backup schedule that is implemented in a disaster recovery (DR) system of a data storage system may be defined based on a recovery time objective (RTO) and a recovery point objective (RPO). The RTO may define an amount of time required to recover the particular data after an error. As RTO decreases, an amount of system resources required for the recovery increases, and associated costs associated with the recovery may also increase. The RPO may define a maximum amount of time, or interval, that may elapse between backups for particular data in the data storage system. As RPO increases, information losses associated with a recovery event may also increase. A particular RTO and RPO may be defined by a user for, for example, particular file types that are stored in the data storage system (e.g., a first file type may have a first RTO/RPO, and a second file type may have a second RTO/RPO). However, usage patterns and behavior may vary widely among files of the same type. Therefore, historical performance data regarding backup and recovery events in the data storage system may be analyzed to determine RTO/RPO strategies in a data storage system. The behavior of various files that are stored in the data storage system may be analyzed and evaluated, and files may be classified into various groups, each group having a particular RTO/RPO, based on the behavioral analysis, rather than based on file type. Iteration analytics and machine learning may be applied to historical backup and recovery records to determine file classifications. User files of the same type may be assigned to different groups based on the historical performance data, and therefore may be assigned different RTO/RPO strategies.

The historical backup records and recovery records may be split into different training sets for analysis. An evaluation of information loss and total savings cost may be determined to provide a score for various storage strategies. The system cost of a backup may be determined based on file size. An appropriate data protection schedule may make enterprise data backup and archiving more efficient, so that reduced resource and energy usage may be achieved in a data storage system. Joint analysis of the system cost and information loss associated with an RTO/RPO strategy may be used to assign an RTO/RPO strategy to a specific user file group.

File classification may be determined based on backup behavior rather than file types and user experience. User files may be classified into groups according to historical performance during backup and recovery using a group of base vectors that are generated to determine the file classifications. Performance data that indicates backup behavior may be collected and serialized as vectors that are used to determine file classifications; each user file in the data storage system may be assigned to a particular file classification regardless of file type. System cost and information loss may be jointly evaluated in order to assign an appropriate RTO/RPO strategy to each file classification.

Figure 1:
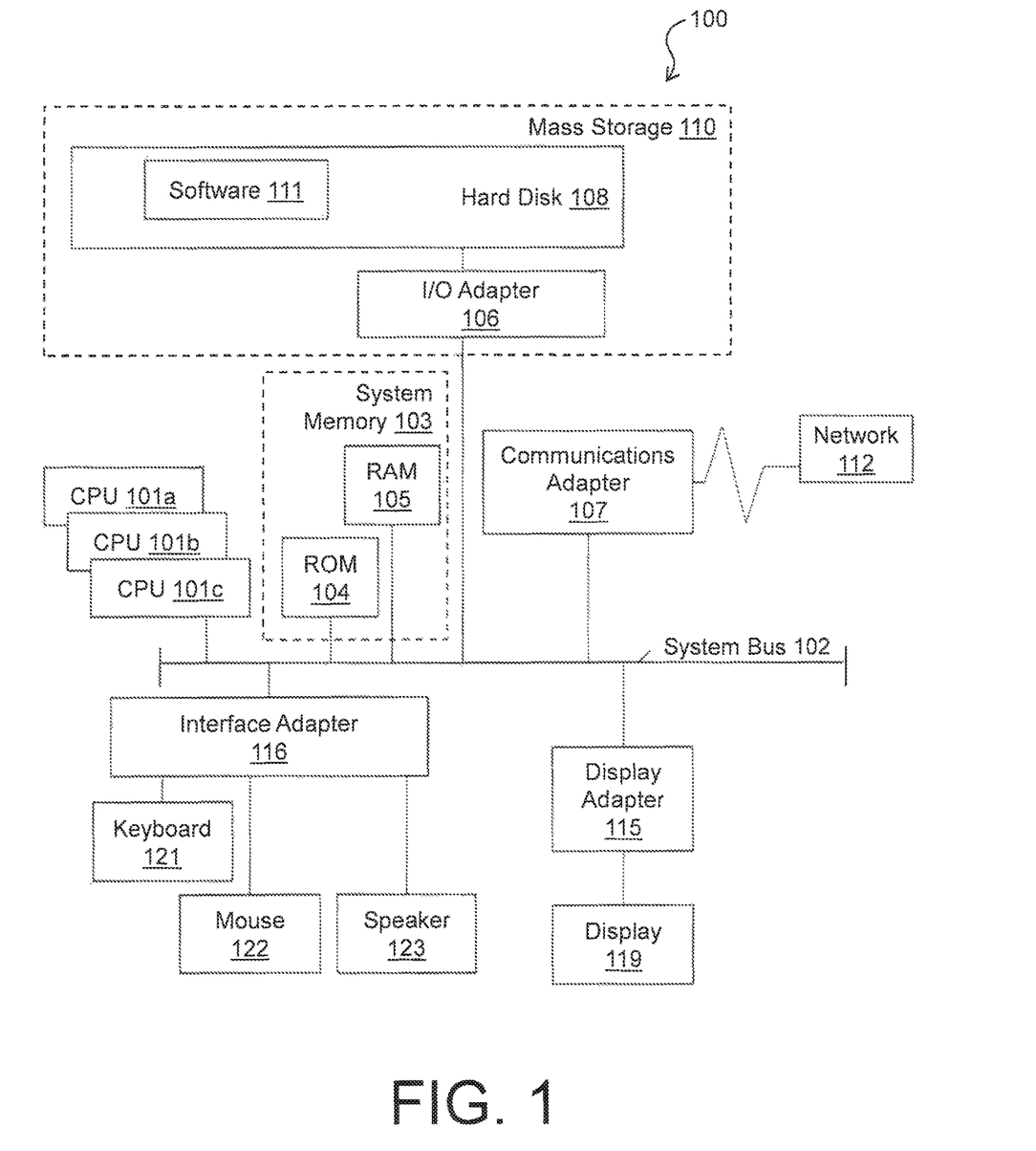
FIG. 1 is a block diagram of an example computer system for use in conjunction with one or more embodiments of data storage strategy determination.

Turning now to FIG. 1, a computer system 100 is generally shown in accordance with an embodiment. The computer system 100 can be an electronic, computer framework comprising and/or employing any number and combination of computing devices and networks utilizing various communication technologies, as described herein. The computer system 100 can be easily scalable, extensible, and modular, with the ability to change to different services or reconfigure some features independently of others. The computer system 100 may be, for example, a server, desktop computer, laptop computer, tablet computer, or smartphone. In some examples, computer system 100 may be a cloud computing node. Computer system 100 may be described in the general context of computer system executable instructions, such as program modules, being executed by a computer system. Generally, program modules may include routines, programs, objects, components, logic, data structures, and so on that perform particular tasks or implement particular abstract data types. Computer system 100 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, the computer system 100 has one or more central processing units (CPU(s)) 101a, 101b, 101c, etc. (collectively or generically referred to as processor(s) 101). The processors 101 can be a single-core processor, multi-core processor, computing cluster, or any number of other configurations. The processors 101, also referred to as processing circuits, are coupled via a system bus 102 to a system memory 103 and various other components. The system memory 103 can include a read only memory (ROM) 104 and a random access memory (RAM) 105. The ROM 104 is coupled to the system bus 102 and may include a basic input/output system (BIOS), which controls certain basic functions of the computer system 100. The RAM is read-write memory coupled to the system bus 102 for use by the processors 101. The system memory 103 provides temporary memory space for operations of said instructions during operation. The system memory 103 can include random access memory (RAM), read only memory, flash memory, or any other suitable memory systems.

The computer system 100 comprises an input/output (I/O) adapter 106 and a communications adapter 107 coupled to the system bus 102. The I/O adapter 106 may be a small computer system interface (SCSI) adapter that communicates with a hard disk 108 and/or any other similar component. The I/O adapter 106 and the hard disk 108 are collectively referred to herein as a mass storage 110.

Software 111 for execution on the computer system 100 may be stored in the mass storage 110. The mass storage 110 is an example of a tangible storage medium readable by the processors 101, where the software 111 is stored as instructions for execution by the processors 101 to cause the computer system 100 to operate, such as is described herein below with respect to the various Figures. Examples of computer program product and the execution of such instruction is discussed herein in more detail. The communications adapter 107 interconnects the system bus 102 with a network 112, which may be an outside network, enabling the computer system 100 to communicate with other such systems. In one embodiment, a portion of the system memory 103 and the mass storage 110 collectively store an operating system, which may be any appropriate operating system, such as the z/OS or AIX operating system from IBM Corporation, to coordinate the functions of the various components shown in FIG. 1.

Additional input/output devices are shown as connected to the system bus 102 via a display adapter 115 and an interface adapter 116 and. In one embodiment, the adapters 106, 107, 115, and 116 may be connected to one or more I/O buses that are connected to the system bus 102 via an intermediate bus bridge (not shown). A display 119 (e.g., a screen or a display monitor) is connected to the system bus 102 by a display adapter 115, which may include a graphics controller to improve the performance of graphics intensive applications and a video controller. A keyboard 121, a mouse 122, a speaker 123, etc. can be interconnected to the system bus 102 via the interface adapter 116, which may include, for example, a Super I/O chip integrating multiple device adapters into a single integrated circuit. Suitable I/O buses for connecting peripheral devices such as hard disk controllers, network adapters, and graphics adapters typically include common protocols, such as the Peripheral Component Interconnect (PCI). Thus, as configured in FIG. 1, the computer system 100 includes processing capability in the form of the processors 101, and, storage capability including the system memory 103 and the mass storage 110, input means such as the keyboard 121 and the mouse 122, and output capability including the speaker 123 and the display 119.

In some embodiments, the communications adapter 107 can transmit data using any suitable interface or protocol, such as the internet small computer system interface, among others. The network 112 may be a cellular network, a radio network, a wide area network (WAN), a local area network (LAN), or the Internet, among others. An external computing device may connect to the computer system 100 through the network 112. In some examples, an external computing device may be an external webserver or a cloud computing node.

It is to be understood that the block diagram of FIG. 1 is not intended to indicate that the computer system 100 is to include all of the components shown in FIG. 1. Rather, the computer system 100 can include any appropriate fewer or additional components not illustrated in FIG. 1 (e.g., additional memory components, embedded controllers, modules, additional network interfaces, etc.). Further, the embodiments described herein with respect to computer system 100 may be implemented with any appropriate logic, wherein the logic, as referred to herein, can include any suitable hardware (e.g., a processor, an embedded controller, or an application specific integrated circuit, among others), software (e.g., an application, among others), firmware, or any suitable combination of hardware, software, and firmware, in various embodiments.

Figure 2:
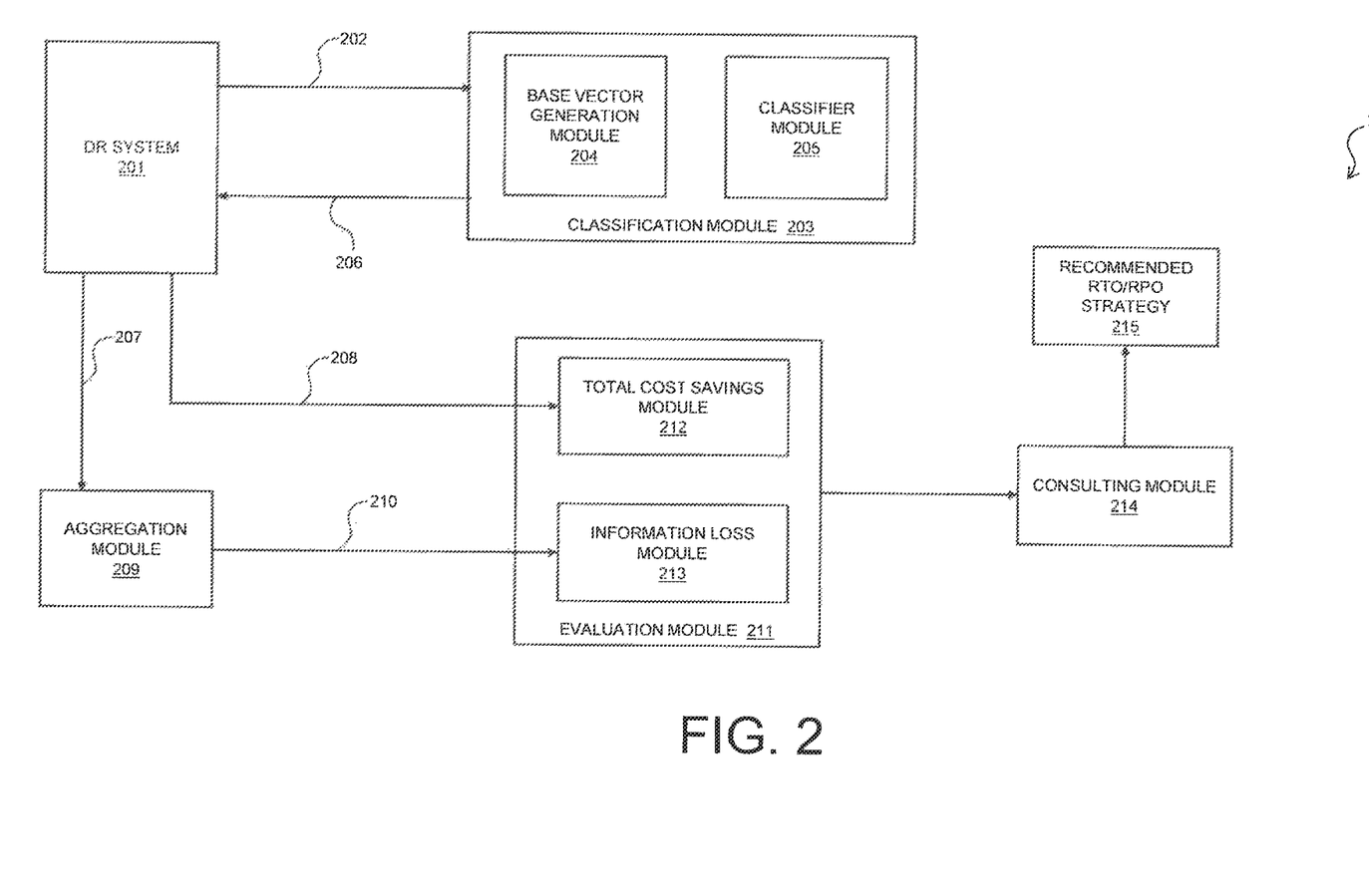
FIG. 2 is a block diagram of components of a system for data storage strategy determination in accordance with one or more embodiments of the present invention.

Turning now to FIG. 2, a system 200 for data storage strategy determination is generally shown in accordance with one or more embodiments of the present invention. System 200 may be implemented in conjunction with any appropriate type of computer system(s), including but not limited to computer system 100 of FIG. 1. System 200 includes a DR system 201 that is part of a data storage system that stores a number of files. The DR system 201 may be included in an enterprise data storage system including a number of interconnected computer memories and processing devices, and may have any appropriate configuration in various embodiments. The data stored in DR system 201 may include any appropriate numbers and types of files. The DR system 201 may implement a data storage strategy comprising an initial RTO/RPO strategy (IRRS) that includes RTO and RPO values that may be defined for various file classifications. The RTO and RPO values of the data storage strategy that is implemented in DR system 201 may be modified during operation of the DR system 201 based on a recommended RTO/RPO strategy 215 that is determined by classification module 203, aggregation module 209, evaluation module 211, and consulting module 214. Operation of system 200 is discussed in further detail below with respect to method 300 of FIG. 3.

DR system 201 provides performance history data 202 to classification module 203, and receives file classifications 206 from classification module 203 based on the performance history data 202. Classification module 203 includes a base vector generation module 204 and a classifier module 205. Operation of classification module 203 is discussed in further detail below with respect to method 400 of FIG. 4. An embodiment of performance history data 202 that may be received by classification module 203 is illustrated with respect to FIG. 5. The base vector generation module 204 may generate a group of base vectors including a defined number (i.e., K) of vectors. The group of base vectors that are generated by base vector generation module 204 may be used by classifier module 205 to assign user files in the DR system 201 to various file classifications, or groups. The file classifications 206 may be determined by classification module 203 based on file behavior during backup and recovery events, and may be independent of file type. DR system 201 generates performance records 208 and classification records 207 based on the file classifications 206.

Evaluation module 211 includes a total cost savings module 212 and an information loss module 213. DR system 201 provides performance records 208 to total cost savings module 212 in evaluation module 211. DR system 201 provides classification records 207 to aggregation module 209. Aggregation module 209 aggregates the classification records 207 based on, in some embodiments, multiples of the IRRS backup interval, and provides aggregated classification records 210 to information loss module 213 in evaluation module 211. Operation of total cost savings module 212 is discussed in further detail below with respect to method 600 of FIG. 6, and operation of information loss module 213 is discussed in further detail below with respect to method 700 of FIG. 7.

Consulting module 214 determines recommended RTO/RPO strategy 215 based on the total cost savings and information losses that were determined by the total cost savings module 212 and the information loss module 213. In some embodiments, the recommended RTO/RPO strategy 215 may be determined based on backup interval, information loss, and cost relationships such as are illustrated in graph 800 of FIG. 8. In some embodiments, the consulting module 214 may generate the recommended RTO/RPO strategy 215 for a specific file group in DR system 201. Recommended RTO/RPO strategy 215 may then be implemented in DR system 201 during further operation of DR system 201.

It is to be understood that the block diagram of FIG. 2 is not intended to indicate that the system 200 is to include all of the components shown in FIG. 2. Rather, the system 200 can include any appropriate fewer or additional components not illustrated in FIG. 2 (e.g., additional memory components, embedded controllers, functional blocks, connections between functional blocks, modules, inputs, outputs, etc.). Further, the embodiments described herein with respect to system 200 may be implemented with any appropriate logic, wherein the logic, as referred to herein, can include any suitable hardware (e.g., a processor, an embedded controller, or an application specific integrated circuit, among others), software (e.g., an application, among others), firmware, or any suitable combination of hardware, software, and firmware, in various embodiments.

Figure 3:
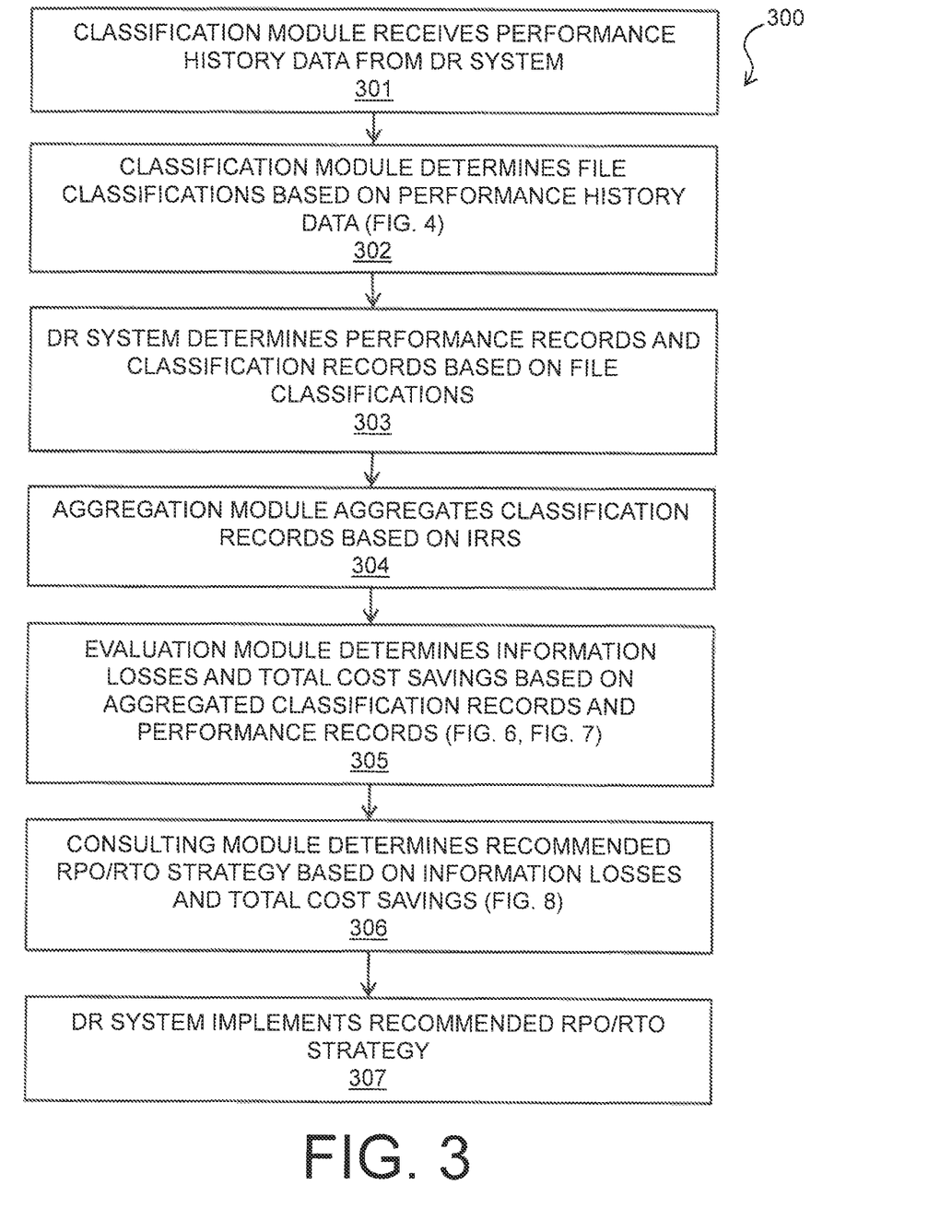
FIG. 3 is a flow diagram of a process for data storage strategy determination in accordance with one or more embodiments of the present invention.

FIG. 3 shows a process flow diagram of a method 300 for data storage strategy determination in accordance with one or more embodiments of the present invention. Method 300 of FIG. 3 may be implemented in, and is discussed with reference to, system 200 of FIG. 2. In block 301 of method 300, classification module 203 receives performance history data 202 from DR system 201 for a number of files that are stored in the DR system 201. The performance history data 202 corresponds to the IRRS currently implemented in the DR system 201, and may include file names and performance data regarding the behavior of each listed file during backup and recovery events in the DR system 201. The performance history data 202 may include any appropriate data, including but not limited to file names and types, solve tree, compute, file input/output (I/O), data verb, confirm verb, end transaction verb, thread wait, other, I/O read/write (R/W), and CPU data. Any appropriate type of data corresponding to any appropriate number and types of files may be included in performance history data 202. An embodiment of performance history data 202 is discussed below with respect to FIG. 5.

In block 302, the classification module 203 determines file classifications 206 based on the performance history data 202, and provides the file classifications 206 to DR system 201. Block 302 is performed by base vector generation module 204 and classifier module 205 in classification module 203, and is discussed in further detail below with respect to method 400 of FIG. 4. The file classifications 206 may divide the user files stored in DR system 201 into a plurality of groups based on similar performance behavior during backup and recovery events. The file classifications 206 may divide the user files into any appropriate number (e.g., K) of groups. User files stored in DR system 201 that have the same file type (e.g., .ppt, .exe, .bin, .doc) may be placed in different groups by file classifications 206, as files having the same type may behave differently during backup and/or recovery events.

In block 303, the DR system 201 generates classification records 207 and performance records 208 using file classifications 206 during operation of the DR system 201 based on the IRRS. Performance data during backup events that are performed according to the IRRS is grouped based on the file classifications 206. The performance records 208 may include different backup intervals. The classification records 207 may be formatted based on a minimum backup interval of the IRRS. In block 304, the classification records 207 are provided to aggregation module 209. The aggregation module 209 aggregates the classification records 207 based on the minimum backup interval of the IRRS, and outputs the aggregated classification records 210 to information loss module 213 in the evaluation module 211. The aggregation module 209 may aggregate the classification records 207 based on multiples of the minimum backup interval of the IRRS (e.g., 5 times, 10 times, 15 times, 20 times, etc.).

In block 305, the total cost savings module 212 in the evaluation module 211 receives the performance records 208, and determines total cost savings for a number of RTO/RPO strategies based on the performance records 208. Determination of the total cost savings by the total cost savings module 212 is discussed below in further detail with respect to method 600 of FIG. 6. The information loss module 213 also receives the aggregated classification records 210 in block 305, and determines information losses for a number of RTO/RPO strategies based on the aggregated classification records 210. As the backup interval increases, possible information loss in a recovery event may also increase. The possible information loss may vary based on the amount of data being backed up and recovered. Determination of the information loss by the information loss module 213 is discussed below in further detail with respect to method 700 of FIG. 7.

In block 306, the consulting module 214 determines a recommended RTO/RPO strategy 215 based on the total cost savings and information losses that were determined by the total cost savings module 212 and the information loss module 213. In some embodiments, the recommended RTO/RPO strategy 215 may be determined based backup interval, information loss, and cost relationships such as are illustrated in graph 800 of FIG. 8. In some embodiments, the consulting module 214 may generate the recommended RTO/RPO strategy 215 for one or more specific file groups in DR system.

In block 307, the recommended RTO/RPO strategy 215 is implemented in DR system 201. Method 300 of FIG. 3 may be repeated periodically during operation of system 200 of FIG. 2 to generate an updated recommended RTO/RPO strategy based on changing conditions in the DR system 201, and implement the updated recommended RTO/RPO strategy in the DR system 201. In a subsequent iteration of method 300 of FIG. 3, the recommended RTO/RPO strategy 215 that was implemented in the DR system 201 in block 307 is the IRRS for determination of the updated recommended RTO/RPO strategy.

The process flow diagram of FIG. 3 is not intended to indicate that the operations of the method 300 are to be executed in any particular order, or that all of the operations of the method 300 are to be included in every case. Additionally, the method 300 can include any suitable number of additional operations.

Figure 4:
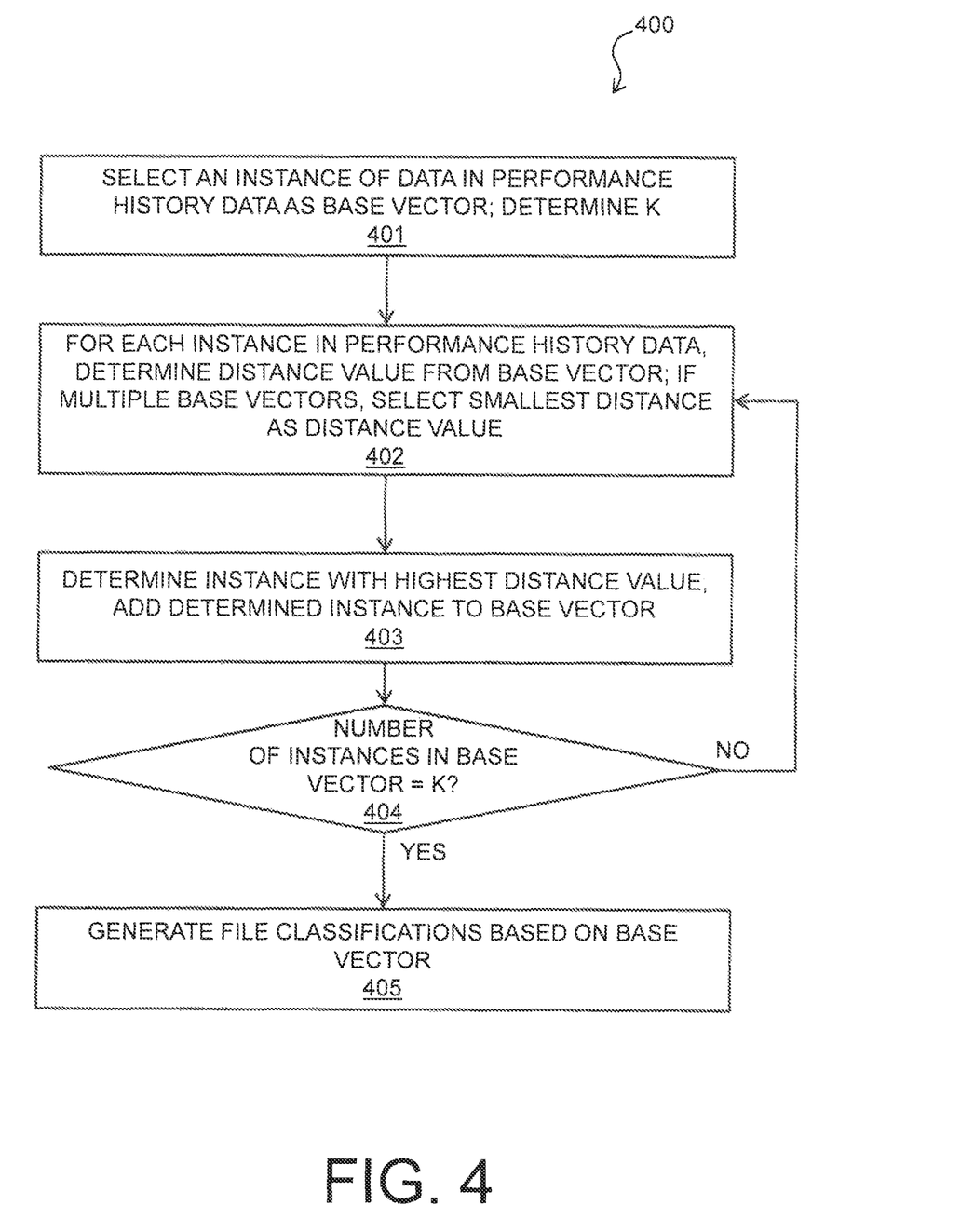
FIG. 4 is a flow diagram of a process for file classification for data storage strategy determination in accordance with one or more embodiments of the present invention.

FIG. 4 is a flow diagram of a method 400 for file classification for data storage strategy determination in accordance with one or more embodiments of the present invention. Method 400 of FIG. 4 may be performed in block 302 of FIG. 3, and may be implemented in classification module 203, including base vector generation module 204 and classifier module 205, of FIG. 2. Method 400 of FIG. 4 operates on performance history data 202; an embodiment of performance history data such as performance history data 202 is illustrated with respect to FIG. 5. In block 401, performance history data 202 is received by the base vector generation module 204, and an instance of input data in the performance history data 202 is selected as a base vector $\{\vec{1}_1\}$ by base vector generation module 204. The selected instance of input data may be a single file and its associated behavioral data in some embodiments. The selected instance of input data may be selected randomly from the set of files in the performance history data 202 in some embodiments.

A base vector size K may also be determined in block 401. In some embodiments, the base vector size K may be a range.

In block 402, for each data instance in the performance history data 202, a distance value between the data instance and the base vector is determined by base vector generation module 204. Distances $d_i$ may be calculated based on equation (EQ) 1, wherein $x_i$ is the data instance, and $l_j$ is the base vector, and N is the number of data instances in the performance history data 202:

$$d_i = \|\vec{x}^i - \vec{1}_j\| \; i = [1, N] \qquad \text{EQ. 1}$$

If there are multiple instances j in the group of base vectors in block 402 (i.e., the base vector is $\{\vec{1}_1, \vec{1}_2, \ldots, \vec{1}_j\}$), a distance is determined from each of the instances in the base vector (e.g., 1 to j), and a smallest distance is selected as the distance value of an instance. A distance array (e.g., $\{d_1, d_2, \ldots, d_N\}$) may be generated in block 402 that includes a single distance value for each data instance in the performance history data 202. In block 403, the data instance having the largest distance value in the distance array is added into the base vector by base vector generation module 204.

In block 404, it is determined whether the number of instances in the base vector is equal to K. If it is determined in block 404 that the number of instances in the base vector is not equal to K, flow returns to block 402 from block 404. Distance values are calculated in block 402, and another instance is added to the base vector in block 403 based on the distance values. Blocks 402 and 403 are repeated until the number of instances j in the base vector is equal to K in block 404. In some embodiments, K may be adjusted during subsequent iterations of blocks 402, 403, and 404. Based on determining that the number of instances in the base vector is equal to K in block 404, flow proceeds from block 404 to block 405. In block 405, the base vector (e.g., $\{\vec{1}_1, \vec{1}_2, \ldots, \vec{1}_K\}$) is provided from the base vector generation module 204 to the classifier module 205. The classifier module 205 generates file classifications 206 based on the base vector in block 405. The base vector is determined such that the groups in file classifications 206 may be relatively far apart from each other. The number of groups in file classifications 206 may be equal to K. The file classifications 206 may then be used by DR system 201 to determine performance records 208 and classification records 207 during further operation of the DR system 201, according to method 300 of FIG. 3.

The process flow diagram of FIG. 4 is not intended to indicate that the operations of the method 400 are to be executed in any particular order, or that all of the operations of the method 400 are to be included in every case. Additionally, the method 400 can include any suitable number of additional operations.

Figure 5:
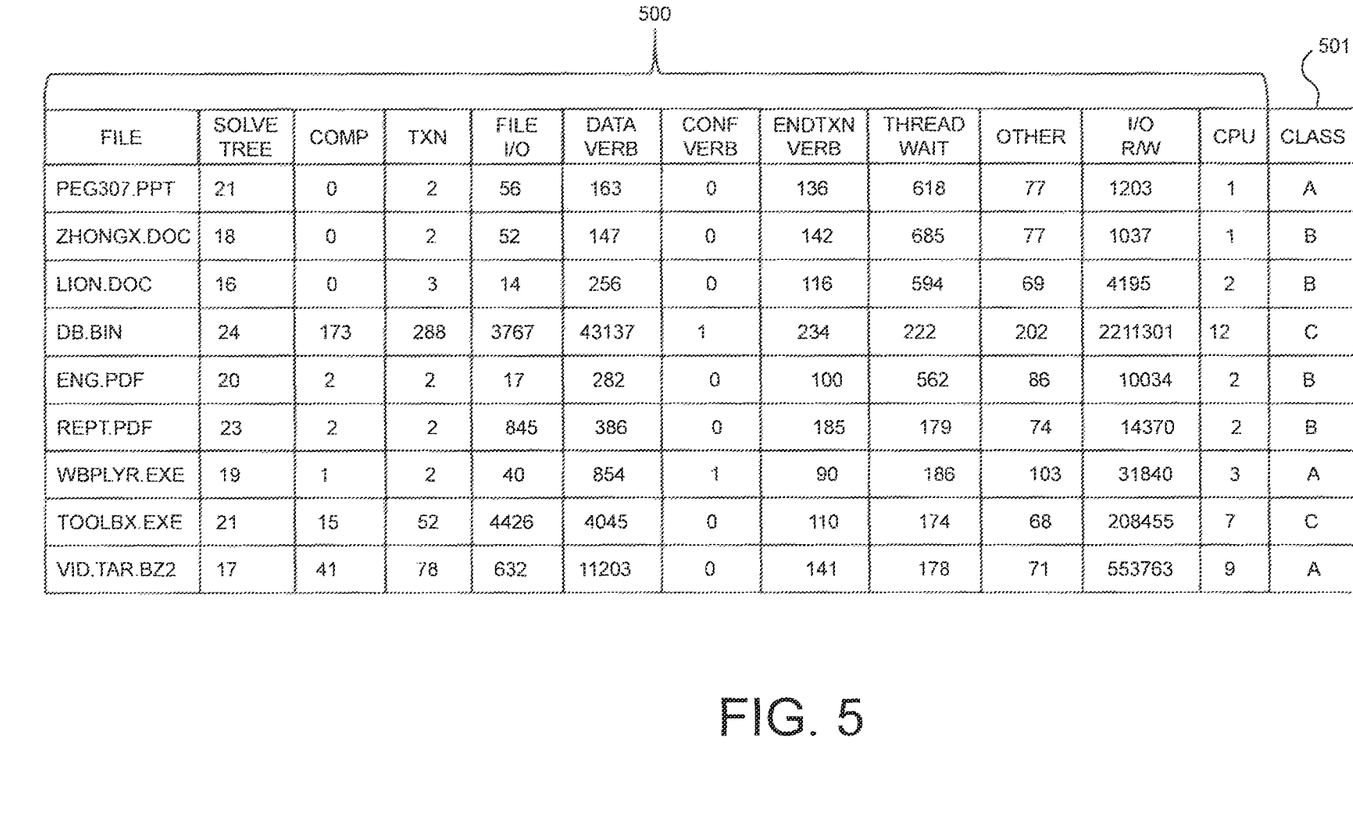
FIG. 5 is a diagram of components of performance history data for data storage strategy determination in accordance with one or more embodiments of the present invention.

FIG. 5 is a diagram of components of performance history data 500 for data storage strategy determination in accordance with one or more embodiments of the present invention. Performance history data 500 may correspond to performance history data 202 of FIG. 2, and may be used in method 400 of FIG. 4 to determine the file classifications 206. Performance history data 500 includes a plurality of data instances, each instance corresponding to a single file. For each file in the performance history data 500, any appropriate associated behavioral data may be included. For example, for a data instance corresponding to file "PEG307.PPT", the file name and type are included with associated values for solve tree, compute, file I/O, data verb, confirm verb, end transaction verb, thread wait, other, I/O R/W, and CPU data. A base vector is determined by base vector generation module 204 based on performance history data 500 as described above with respect to method 400 of FIG. 4, and classifications 501 (e.g., group A, group B, or group C) for each instance (e.g., each file and associated behavioral data) are determined by classifier module 205 based on the base vector. The classifications 501 are provided as file classifications 206 to DR system 201.

FIG. 5 is shown for illustrative purposes only. Embodiments of performance history data such as are shown in FIG. 5 may include any appropriate data that may be generated by a DR system such as DR system 201 of FIG. 2.

Figure 6:
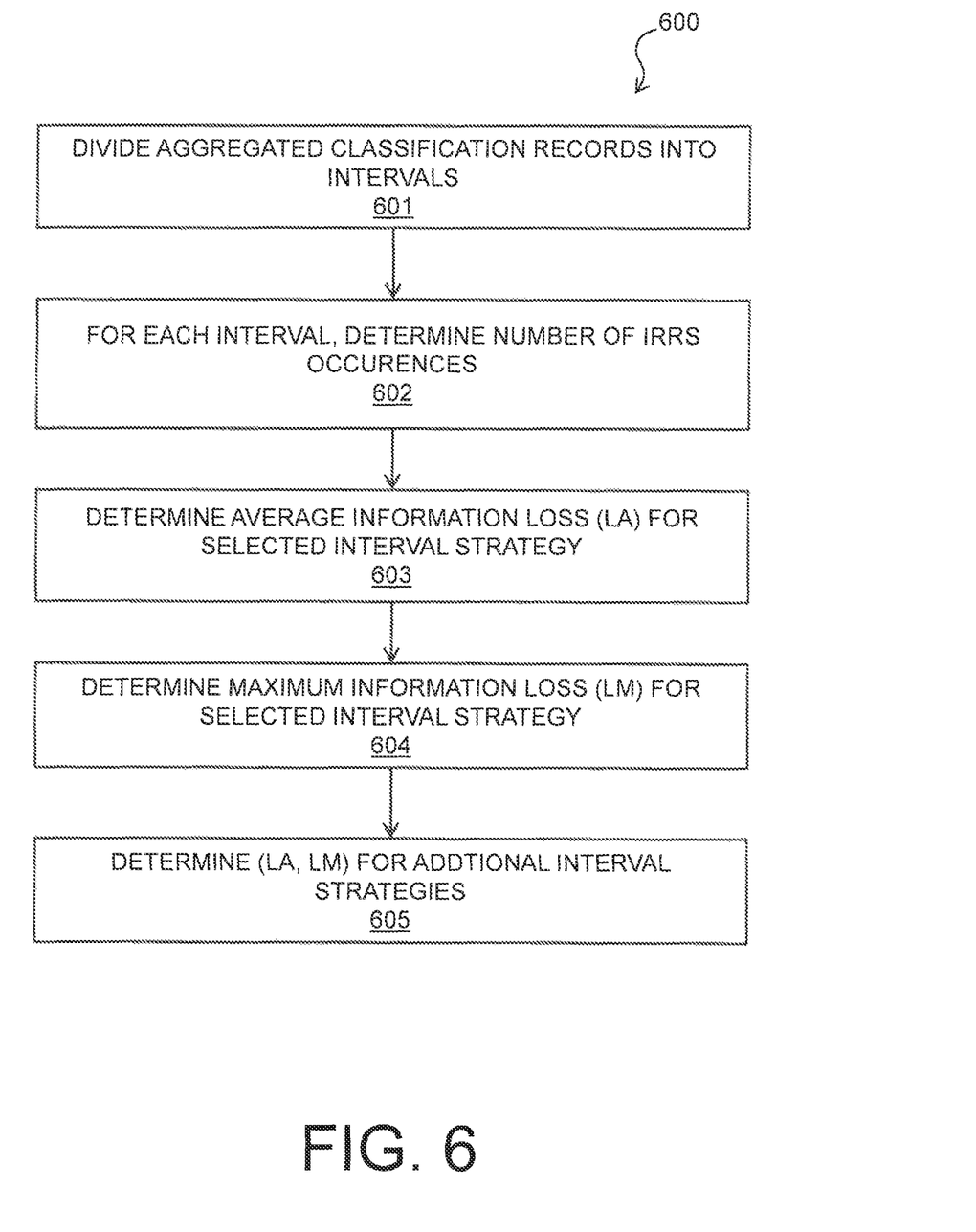
FIG. 6 is a flow diagram of a process for information loss determination for data storage strategy determination in accordance with one or more embodiments of the present invention.

FIG. 6 is a flow diagram of a method 600 for information loss determination for data storage strategy determination in accordance with one or more embodiments of the present invention. Method 600 may be performed in block 305 of FIG. 3, and may implemented in information loss module 213 in evaluation module 211 of FIG. 2. Method 600 may operate on aggregated classification records 210 received from aggregation module 209 of FIG. 2. In block 601, the aggregated classification records 210 are divided into intervals based on the IRRS. The total number of intervals may be n. In block 602, for each interval, a number of IRRS occurrences is determined. For each interval i (for i from 1 to n) a number m of IRRS events during the interval is determined, and for each IRRS event j, a data size $s_j$ and an IRRS time $t_j$ to the end of the interval are determined. For a single interval, an information loss may be determined based on EQ 2:

$$\frac{\sum_{j=1}^{m-1} s_j t_j}{\sum_{j=1}^{m} s_j}.$$

EQ. 2

An average information loss $L_A$ of a selected interval strategy (e.g., a given RTO/RPO) is determined based on the information loss in block 603, according to EQ. 3:

$$L_A = \frac{\sum_{i=1}^{n} \frac{\sum_{j=1}^{m_i-1} s_j t_j}{\sum_{j=1}^{m_i} s_j}}{n}.$$

EQ. 3

A maximum information loss $L_M$ of the selected interval strategy is determined based on the information loss in block 604, according to EQ. 4:

$$L_M = \max_{0 \le i \le n} \frac{\sum_{j=1}^{m_i-1} s_j t_j}{\sum_{j=1}^{m_i} s_j}.$$

EQ. 4

The loss values ($L_A$, $L_M$), determined according to blocks 603 and 604, give a total information loss for the selected interval strategy. Additional ($L_A$, $L_M$) values may be determined for any appropriate number of additional interval strategies in block 605 of method 600, including longer backup intervals, as described above with respect to blocks 601-604. As the backup interval increases, the possible information loss may also increase.

The process flow diagram of FIG. 6 is not intended to indicate that the operations of the method 600 are to be executed in any particular order, or that all of the operations of the method 600 are to be included in every case. Additionally, the method 600 can include any suitable number of additional operations.

Figure 7:
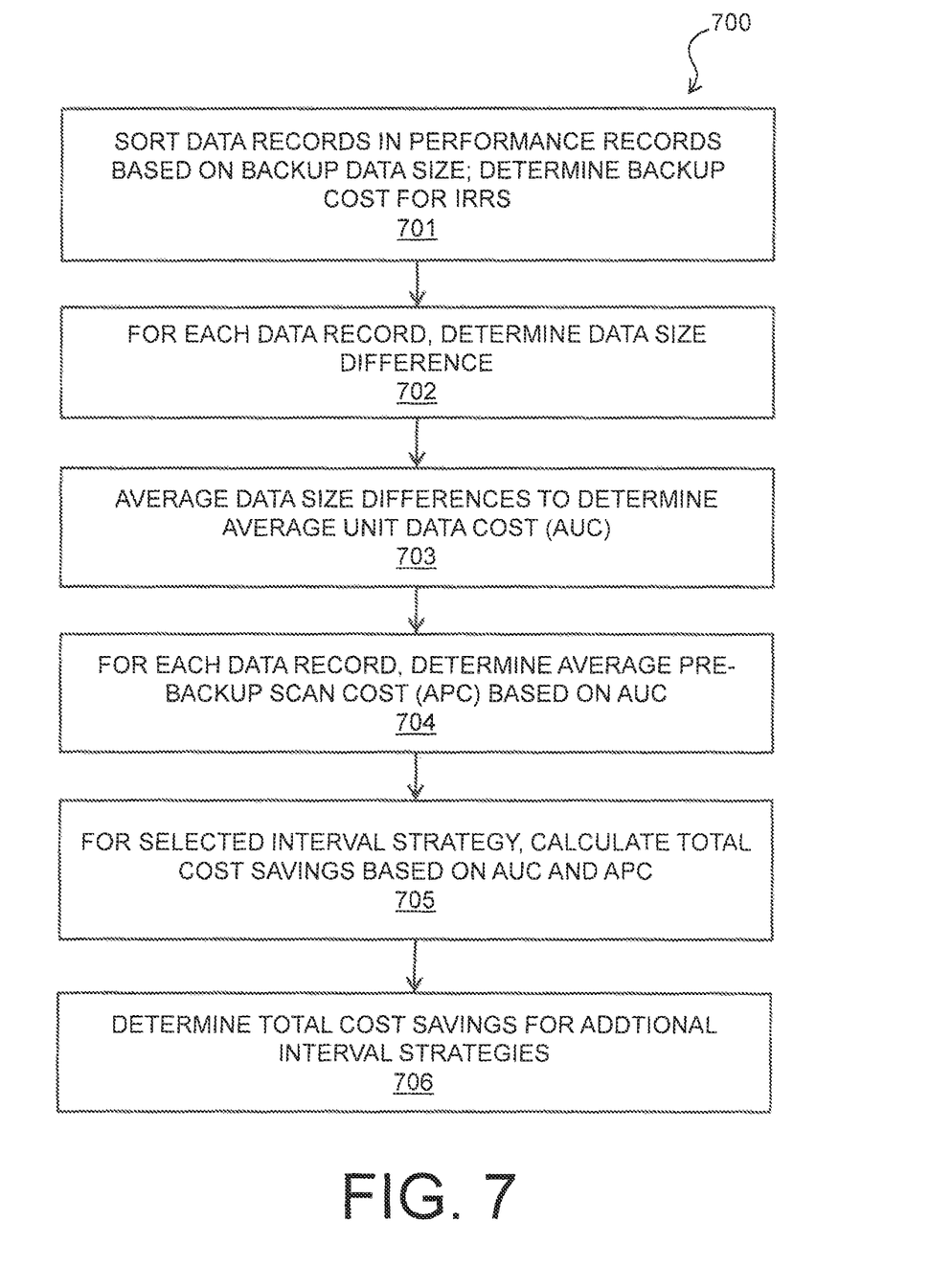
FIG. 7 is a flow diagram of a process for cost savings determination for data storage strategy determination in accordance with one or more embodiments of the present invention.

FIG. 7 is a flow diagram of a method 700 for cost savings determination for data storage strategy determination in accordance with one or more embodiments of the present invention. Method 700 may be performed in block 305 of FIG. 3, and may be implemented in total cost savings module 212 in evaluation module 211 of FIG. 2. Method 700 may operate on performance records 208 received from DR system 201 of FIG. 2. In block 701, the data records in the performance records 208 are sorted based on backup data size to generate serialized records, and the total backup cost for the IRRS is determined to be $P_{max}$. The total backup cost may include a pre-backup scan cost and a backup cost. The pre-backup scan cost corresponds to a scan of a data record that is performed before a backup event, and may be independent of the size of the data record. The backup cost may vary based on a size of a data record. In block 702, for each data record in the serialized data records, a data size difference is determined by subtracting the size of a previous data record in the serialized records from the size of the data record. The data size differences of each of the data records are averaged in block 703 to determine an average unit data cost (AUC).

In block 704, an average pre-backup scan cost (APC) is determined. To determine the APC, the backup cost for each data record is determined based on the AUC, and the backup cost is subtracted from the total backup cost for each data record to determine a pre-backup scan cost for each data record. The pre-backup scan costs of each of the data records are averaged to determine the APC.

In block 705, for a selected interval strategy i, the total cost savings $P_i$ is determined based on EQ. 5:

$$P_i = 1 - \frac{(APC) + \sum_{j=1}^{m_i} s_j(AUC)}{P_{max}}$$

EQ. 5

The total cost savings $P_i$, determined according to block 705, gives a total cost savings for the selected interval strategy. Additional $P_i$ values may be determined for any appropriate number of additional interval strategies in block 706 of method 700, including longer backup intervals, as described above with respect to blocks 701-705.

The process flow diagram of FIG. 7 is not intended to indicate that the operations of the method 700 are to be executed in any particular order, or that all of the operations of the method 700 are to be included in every case. Additionally, the method 700 can include any suitable number of additional operations.

Figure 8:
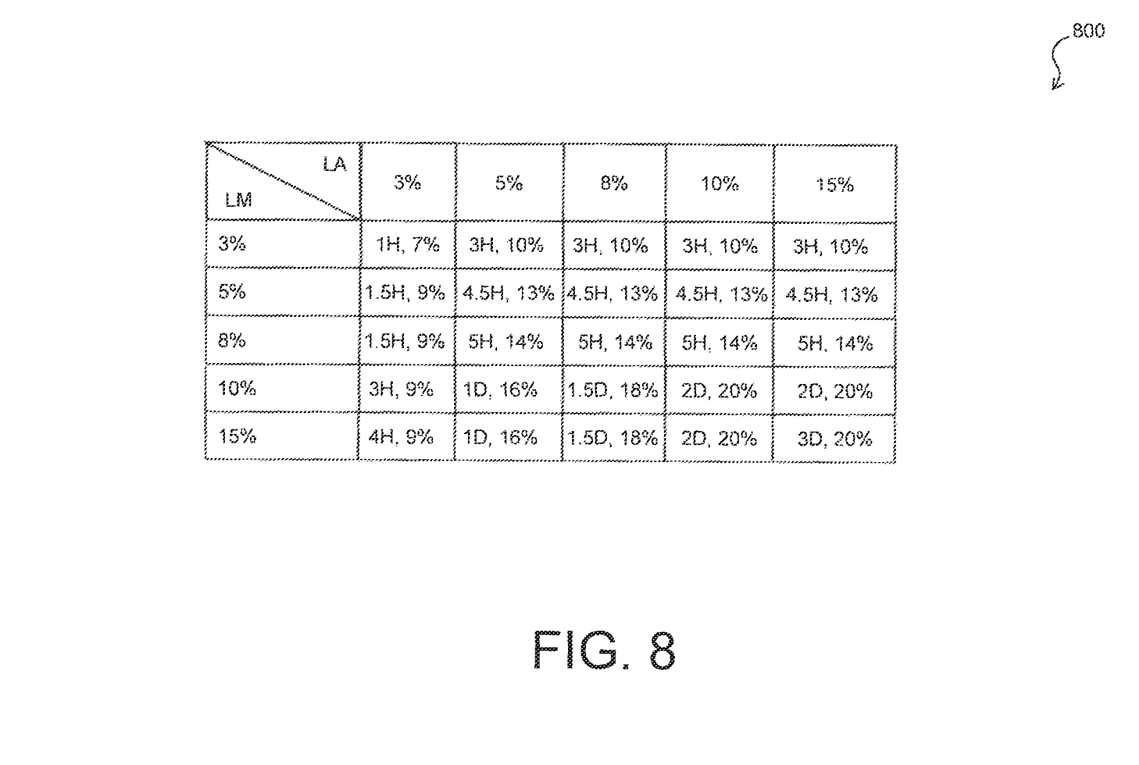
FIG. 8 is a diagram of a graph for use by a consulting module for data storage strategy determination in accordance with one or more embodiments of the present invention.

FIG. 8 is a diagram of a graph 800 for use by a consulting module, such as consulting module 214 of FIG. 2, for data storage strategy determination in accordance with one or more embodiments of the present invention. The graph 800 show associated backup intervals (e.g., a number of hours H or days D) and total cost savings ($P_i$, by percentage, as compared to cost of IRRS) corresponding to a plurality of values of average information loss $L_A$ (by percentage) and maximum information loss $L_M$ (by percentage) for a single classification of files (e.g., one of group A, group B, or group C, as shown in FIG. 5). Each backup interval and corresponding total cost savings corresponds to a particular RTO/RPO strategy. The recommended RTO/RPO strategy 215 may be determined by consulting module 214 for the particular file group based on relationships such as are illustrated by graph 800 in block 306 of FIG. 3.

For example, a user may require particular information loss values for ($L_A$, $L_M$) for a file. Graph 800 may be used to identify which RTO/RPO should be applied to the group that includes the file; the identified RTO/RPO may be included in recommended RTO/RPO strategy 215 for the group. For example, for a certain file, if a user wants a decrease of at least 15% in total system cost with a minimum effect on recovery, a 1 day backup interval may be used, which gives a total cost savings of 16%, an $L_A$ of 5%, and a $L_M$ of 10%.

FIG. 8 is shown for illustrative purposes only. Embodiments of a graph for use by a consulting module for data storage strategy determination such as is shown in FIG. 8 may include any appropriate data that may be used to determine a recommended RTO/RPO strategy of a DR system such as DR system 201 of FIG. 2, and may include relationships between any appropriate $L_A$, $L_M$, $P_i$, and backup interval values that may be arranged in any appropriate manner.

Various embodiments of the invention are described herein with reference to the related drawings. Alternative embodiments of the invention can be devised without departing from the scope of this invention. Various connections and positional relationships (e.g., over, below, adjacent, etc.) are set forth between elements in the following description and in the drawings. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship. Moreover, the various tasks and process steps described herein can be incorporated into a more comprehensive procedure or process having additional steps or functionality not described in detail herein.

One or more of the methods described herein can be implemented with any or a combination of the following technologies, which are each well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

For the sake of brevity, conventional techniques related to making and using aspects of the invention may or may not be described in detail herein. In particular, various aspects of computing systems and specific computer programs to implement the various technical features described herein are well known. Accordingly, in the interest of brevity, many conventional implementation details are only mentioned briefly herein or are omitted entirely without providing the well-known system and/or process details.

In some embodiments, various functions or acts can take place at a given location and/or in connection with the operation of one or more apparatuses or systems. In some embodiments, a portion of a given function or act can be performed at a first device or location, and the remainder of the function or act can be performed at one or more additional devices or locations.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The present disclosure has been presented for purposes of illustration and description, but is not intended to be exhaustive or limited to the form disclosed. Many modifications and variations will be apparent to those of ordinary skill in the art without departing from the scope and spirit of the disclosure. The embodiments were chosen and described in order to best explain the principles of the disclosure and the practical application, and to enable others of ordinary skill in the art to understand the disclosure for various embodiments with various modifications as are suited to the particular use contemplated.

The diagrams depicted herein are illustrative. There can be many variations to the diagram or the steps (or operations) described therein without departing from the spirit of the disclosure. For instance, the actions can be performed in a differing order or actions can be added, deleted or modified. Also, the term "coupled" describes having a signal path between two elements and does not imply a direct connection between the elements with no intervening elements/connections therebetween. All of these variations are considered a part of the present disclosure.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" are understood to include any integer number greater than or equal to one, i.e. one, two, three, four, etc. The terms "a plurality" are understood to include any integer number greater than or equal to two, i.e. two, three, four, five, etc. The term "connection" can include both an indirect "connection" and a direct "connection."

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instruction by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

What is claimed is:

1. A computer-implemented method comprising:
    determining, by a processor, a plurality of file classifications for files that are stored in a data storage system based on performance history data of a disaster recovery (DR) system of the data storage system, wherein determining the plurality of file classifications for files that are stored in the DR system based on the performance history data of the DR system comprises:
        determining a base vector based on the performance history data, wherein determining the base vector based on the performance history data comprises:
            adding a first instance of data from the performance history data to the base vector;
            for each remaining instance of data in the performance history data, determining a distance value between the remaining instance and the base vector, wherein, based on the base vector comprising multiple instances of data, a respective distance is determined for each of the multiple instances of data in the base vector, and a lowest distance is selected as the distance value for the remaining instance; and
            adding a second instance of data from the performance history data to the base vector, wherein the second instance of data corresponds to a highest distance value of the determined distance values; and
        determining the plurality of file classifications based on the base vector;
    determining an information loss based on the performance records;
    determining a total cost savings based on the classification records;
    determining a recommended recovery time objective (RTO)/recovery point objective (RPO) strategy based on the information loss and the total cost savings; and
    implementing the recommended RTO/RPO strategy in the DR system.

2. The method of claim 1, wherein an instance of data in the performance history data comprises a file name, a file type, a file input/output (I/O) value, a thread wait value, an I/O read/write (R/W) value, and a central processing unit (CPU) data value.

3. The method of claim 1, wherein determining the information loss based on the performance records comprises:
    determining an average information loss (LA) for a selected interval strategy based on an initial RTO/RPO strategy (IRRS) that is implemented in the DR system; and
    determining a maximum information loss (LM) for the selected interval strategy based on the IRRS;
    wherein the information loss comprises LA and LM.

4. The method of claim 3, wherein determining the total cost savings based on the classification records comprises:
    determining an average unit data cost (AUC) for each of the classification records based on the IRRS;
    determining an average pre-backup scan cost (APC) based on the IRRS; and
    determining the total cost savings based on the AUC and the APC.

5. The method of claim 4, wherein determining the recommended RTO/RPO strategy based on the information loss and the total cost savings comprises:
    determining a relationship between a backup interval, LA, LM, and the total cost savings, wherein the recommended RTO/RPO strategy corresponds to the backup interval.

6. A system comprising:
    a memory having computer readable instructions; and
    one or more processors for executing the computer readable instructions, the computer readable instructions controlling the one or more processors to perform operations comprising:
        determining a plurality of file classifications for files that are stored in a data storage system based on performance history data of a disaster recovery (DR) system of the data storage system, wherein determining the plurality of file classifications for files that are stored in the DR system based on the performance history data of the DR system comprises:
            determining a base vector based on the performance history data, wherein determining the base vector based on the performance history data comprises:
                adding a first instance of data from the performance history data to the base vector;
                for each remaining instance of data in the performance history data, determining a distance value between the remaining instance and the base vector, wherein, based on the base vector comprising multiple instances of data, a respective distance is determined for each of the multiple instances of data in the base vector, and a lowest distance is selected as the distance value for the remaining instance; and
                adding a second instance of data from the performance history data to the base vector, wherein the second instance of data corresponds to a highest distance value of the determined distance values; and
            determining the plurality of file classifications based on the base vector;
        determining classification records and performance records for the DR system based on the plurality of file classifications;
        determining an information loss based on the performance records;
        determining a total cost savings based on the classification records;
        determining a recommended recovery time objective (RTO)/recovery point objective (RPO) strategy based on the information loss and the total cost savings; and
        implementing the recommended RTO/RPO strategy in the DR system.

7. The system of claim 6, wherein an instance of data in the performance history data comprises a file name, a file type, a file input/output (I/O) value, a thread wait value, an I/O read/write (R/W) value, and a central processing unit (CPU) data value.

8. The system of claim 6, wherein determining the information loss based on the performance records comprises:

determining an average information loss (LA) for a selected interval strategy based on an initial RTO/RPO strategy (IRRS) that is implemented in the DR system; and determining a maximum information loss (LM) for the selected interval strategy based on the IRRS;

wherein the information loss comprises LA and LM.

9. The system of claim 8, wherein determining the total cost savings based on the classification records comprises:

determining an average unit data cost (AUC) for each of the classification records based on the IRRS;

determining an average pre-backup scan cost (APC) based on the IRRS; and determining the total cost savings based on the AUC and the APC.

10. The system of claim 9, wherein determining the recommended RTO/RPO strategy based on the information loss and the total cost savings comprises:

determining a relationship between a backup interval, LA, LM, and the total cost savings, wherein the recommended RTO/RPO strategy corresponds to the backup interval.

11. A computer program product comprising a computer readable storage medium having program instructions embodied therewith, the program instructions executable by a processor to cause the processor to perform operations comprising:

determining a plurality of file classifications for files that are stored in a data storage system based on performance history data of a disaster recovery (DR) system of the data storage system, wherein determining the plurality of file classifications for files that are stored in the DR system based on the performance history data of the DR system comprises:

determining a base vector based on the performance history data, wherein determining the base vector based on the performance history data comprises:

adding a first instance of data from the performance history data to the base vector;

for each remaining instance of data in the performance history data, determining a distance value between the remaining instance and the base vector, wherein, based on the base vector comprising multiple instances of data, a respective distance is determined for each of the multiple instances of data in the base vector, and a lowest distance is selected as the distance value for the remaining instance; and adding a second instance of data from the performance history data to the base vector, wherein the second instance of data corresponds to a highest distance value of the determined distance values; and determining the plurality of file classifications based on the base vector;

determining classification records and performance records for the DR system based on the plurality of file classifications;

determining an information loss based on the performance records;

determining a total cost savings based on the classification records;

determining a recommended recovery time objective (RTO)/recovery point objective (RPO) strategy based on the information loss and the total cost savings; and implementing the recommended RTO/RPO strategy in the DR system.

12. The computer program product of claim 11, wherein an instance of data in the performance history data comprises a file name, a file type, a file input/output (I/O) value, a thread wait value, an I/O read/write (R/W) value, and a central processing unit (CPU) data value.

13. The computer program product of claim 11, wherein determining the information loss based on the performance records comprises:

determining an average information loss (LA) for a selected interval strategy based on an initial RTO/RPO strategy (IRRS) that is implemented in the DR system; and determining a maximum information loss (LM) for the selected interval strategy based on the IRRS;

wherein the information loss comprises LA and LM.

14. The computer program product of claim 13, wherein determining the total cost savings based on the classification records comprises:

determining an average unit data cost (AUC) for each of the classification records based on the IRRS;

determining an average pre-backup scan cost (APC) based on the IRRS; and determining the total cost savings based on the AUC and the APC.

* * * * *